United States Patent [19]
Matsuzaki et al.

[11] Patent Number: 6,137,658
[45] Date of Patent: Oct. 24, 2000

[54] APPARATUS FOR GUIDING AND LOCKING A ROTARY ACTUATOR

[75] Inventors: Shinichi Matsuzaki, Fujisawa; Kohji Serizawa, Zama; Mutsuro Ohta, Yokohama; Keishi Takahashi, Fujisawa, all of Japan

[73] Assignee: International Business Machines Corporation, Armonk, N.Y.

[21] Appl. No.: 09/161,057

[22] Filed: Sep. 25, 1998

[30] Foreign Application Priority Data

Sep. 26, 1997 [JP] Japan ............................ 9-262248

[51] Int. Cl.⁷ ............................................ G11B 5/54
[52] U.S. Cl. .................................................. 360/256.2
[58] Field of Search ................................. 360/106, 105, 360/256.2, 254.7, 254.8

[56] References Cited

U.S. PATENT DOCUMENTS 5,170,300  12/1992  Stefansky ............................. 360/105
5,729,405  3/1998  Isomura et al. ...................... 360/105
5,742,455  4/1998  Boutaghou ........................... 360/105

FOREIGN PATENT DOCUMENTS 5-54573    3/1993   Japan .
8-339645   12/1996  Japan .

Primary Examiner—Craig A. Renner
Attorney, Agent, or Firm—Robert B. Martin

[57] ABSTRACT

An apparatus to guide and lock a rotary actuator at a limiting rotational angle in a disk storage. A rotary actuator is attached within a housing so that it is rotatable on a pivot shaft. An iron piece is rotated integrally with the rotary actuator and is attracted in magnetic cooperation with a lock magnet. A retract magnet is attached to housing and assists in rotation of the actuator during an unload operation in which the rotary actuator is removed to a load/unload ramp.

8 Claims, 14 Drawing Sheets

B-B

APPARATUS FOR GUIDING AND LOCKING A ROTARY ACTUATOR

BACKGROUND OF THE INVENTION

1. Field of the Invention

The present invention relates to the control of the rotational movement of a disk positioning actuator within a disk storage. More specifically, the invention relates to a rotation assisting mechanism that assists rotation of a rotary actuator so that the actuator is appropriately unloaded with a load/unload (L/UL) mechanism within the hard disk drive when power to the disk drive is turned off.

2. Background Art

FIG. 1 shows a hard disk drive (HDD) 10 which is a disk storage. The HDD 10 is an information storage apparatus making use of (a) a housing 12 which encloses the interior mechanism, (b) at least one rotatable disk 14 with a plurality of concentric data tracks (not shown) each containing information, (c) a magnetic head (not shown) for reading out data from the data tracks or writing data to the data tracks, and (d) a head positioning actuator 20 with the magnetic head at its end for moving the magnetic head to a desired track and supporting it over the desired track during read and write operations. This embodiment has a rotary actuator attached to a spindle 16 (pivot shaft) so that it is rotatable on the spindle 16.

Describing a more specific embodiment, the magnetic head (not shown) includes one or more magnetoresistive (MR) sensors and write transducers. The magnetic head is attached to an air bearing slider 18. The rotation of the magnetic disk creates a thin cushion of air that floats the slider 18 off the data tracks of the disk. The slider 18 is attached to the back surface of the suspension 24 (FIG. 1), and the suspension 24 is connected to an actuator arm 22. The actuator arm 22 is connected to a coil support assembly 40 so that it can be rotated integrally with the coil support assembly. The coil support assembly 40 includes a wire coil 42 which generates a magnetic field when current flows through the wire coil 42 and coil support portions 44 which support the wire coil 42 therebetween.

Two voice coil motor (VCM) magnets 50 are fixed and attached to the side of the housing 12 (one magnet on this side is not shown for viewing), and the magnets 50 constitute part of a VCM which is a motor. When force is developed according to Fleming's law by the relation between the magnetic field present between the magnets 50 and the magnetic field generated when current flows through the wire coil 42, then the actuator assembly 20 and the coil support assembly 40 rotatable integrally with the actuator assembly will be pivoted on the spindle 16.

Various components in the HDD 10 are controlled by control signals generated by a control unit 46. For example, application of current to the coil 42, rotation of the disk 14, and data read and write operations by the magnetic head are controlled by the control unit 46.

The slider 18 is always given a biasing force with respect to the disk surface by the suspension 24, and the biasing force is set so that it is well balanced with a thin cushion of air created by rotation of the disk. The suspension 24 is given flexibility so that the slider 18 is positioned stably and well over the disk being rotated.

Tab 26 extends from the point end of the suspension 24. The entire suspension is a cantilever structure supported at the spindle 16. Therefore, when the tab 26 is supported at the point end, that is, the free end, the handling of the biasing force will be easy. In addition, the deflection of the free end of the suspension can easily be controlled by the tab 26. Furthermore, the slider 18 and the tab 26 are attached at a position near the point end of the suspension, so when tab 26 is supported, the slider 18 can be separated indirectly from the surface of the disk 14. In this embodiment an assembly consisting of the actuator arm 22, suspension 24, and the tab 26 will be called an actuator assembly 20 for the convenience of explanation. This actuator assembly serves as a rotary actuator.

In a load/unload mechanism provided in the HDD 10, the actuator assembly can be moved onto or removed from the disk 14 by controlling the tab 20. In the case where power to the HDD 10 is turned off or when an error occurs and it is desired to end the data read and write operations, the operation of positioning the head over the disk is stopped and an operation of removing or unloading the actuator toward a ramp 30 provided near the outer circumference of the disk is performed. In the unload operation, the actuator assembly 20 is rotated to the ramp 30, and the tab 26 of the actuator assembly 20 is locked in that position until power is restored. When power is restored, a load operation is performed to start a data read operation or a data write operation. In the load operation the tab 26 of the actuator assembly 20 is unlocked from the ramp 30, and the actuator assembly 20 is moved onto the rotating disk.

FIG. 2 is a perspective view showing the ramp 30 that serves as a load/unload mechanism. The ramp 30 is fixed to the housing 12 by use of a support portion 31, for example.

FIG. 3 is a side view of the ramp in FIG. 2 taken substantially along line A—A of FIG. 2, and FIG. 4 is a side view of the ramp in FIG. 2 taken substantially along line B—B of FIG. 2. In this embodiment, four tabs 26 of four actuator assemblies 20 are shown which can be used with two double-sided magnetic disks 14 with data tracks on each disk surface. The final location of the tabs 26 are indicated by broken lines in FIG. 3. Also, the positions of the disks 14 are indicated by broken lines in FIG. 3. The tabs 26 have been given biasing forces (elastic forces) by the suspensions 24 so that they are pressed against the removing surfaces 34a through 34d of the ramp 30, so the tabs 26 can stay at the removing positions. For members with the same configuration, reference characters a through d have been added in sequence after reference numerals to discriminate them from one another. Also, when the suspensions 18 and the sliders 24 are in the removed states, the heads (sliders) are disengaged from the surfaces of the disk 14 and are held, as shown in FIG. 4.

In the case of a load operation, the propulsive force for moving the actuator assembly onto the disk surface can be obtained after power to the HDD is turned on. However, in the case of an unload operation, power supply is stopped, and the actuator assembly must be rotated and moved to the removing position. That is, in order to remove the actuator assembly safely to the removing surface 34a, some energy has to be supplied by an external unit.

In conventional load/unload type HDDs, when power is turned off, the inertial force of the spindle motor rotating the disk 14 is collected and energy required for removal is obtained from this counter electromotive force. More specifically, by causing current to flow through voice coil 42 of a voice coil motor (VCM) with the counter electromotive force, rotational force (torque) is given as assistance to the motor, thereby unloading a rotary type actuator. In order for the unloading of the rotary actuator to succeed, the tab 26 on the point end of the rotary actuator has to slide over the removing place of the ramp 30, particularly the inclinations 33a. Therefore, there is a need to overcome torque which is generated by the friction between the tab 26 and the surface of the ramp 30 (which acts as a resistance to the movement of the tab 26). That is, if the torque given as assistance to the VCM cannot overcome the torque generated by the friction acting as a resistance to the movement of the tab 26, then the rotary actuator cannot reach the final removing position and therefore the removal will not succeed.

If the major factors for removal to succeed are extracted and evaluated, it is found that the following Equation 1 must be satisfied:

$$Kv \times Ke \times \Omega / (Rv + Rm) > F \times r$$

where:

Kv=torque constant of the VCM [N m/A];

Ke=counter electromotive force constant of the spindle motor [V sec/rad];

$\Omega$=number of revolutions of the spindle motor [rad/sec];

Rv=coil resistance of the VCM [ohm];

Rm=coil resistance of the spindle motor [ohm];

F=frictional force between the tab on the point end of the suspension and the ramp [N]; and r=distance from the pivot center of the actuator assembly to the tab on the point end of the suspension [m].

The aforementioned relation can easily be derived if the operation of removing the tab to the ramp is considered. The relation is derived as follows: The counter electromotive voltage of the spindle motor E[V] is represented by E=Ke× $\Omega$, and the counter electromotive voltage is employed so that current flows through the VCM. Therefore, for the case where the coil of the spindle motor and the coil of the VCM are connected in series, the current l [A] which flows through the coil of the VCM is expressed by l=E/(Rv+Rm). Since the torque T [Nm] of the VCM is expressed by T=Kv×l, the left side of Equation 1 is derived as torque which is generated by the VCM when power is turned off. On the other hand, the right side of Equation 1 is derived dynamically as torque which is generated by the friction between the actuator and the ramp. Note that since the slider is supported near the disk surface by a thin cushion of air created by rotation of the disk, the friction force between slider and the air cushion is negligible compared with the friction between the tab on the point end of the suspension and the ramp.

With a reduction in the size of electronic computers, an attempt has been made to fabricate very thin hard disk drives. For example, in a very thin HDD with a thickness (in a paper surface depth direction of FIG. 1) of 9.5 mm or 12.5 mm, the thickness (height) of the spindle motor will also be thin. The height of a magnetic circuit which is incorporated into the motor interior becomes low and the effective length becomes short, and consequently, it becomes difficult to obtain a desired torque constant. The relation between the torque constant Kt [N m/A] and the counter electromotive force constant Ke [V sec/rad] becomes Kt=Ke. Taking numerical values for reference, Ke and Kv are 0.0089 and 0.23 for a HDD with a thickness of 12.5 mm and Ke and Kv are 0.0071 and 0.11 for a HDD with a thickness of 9.5 mm.

To compensate for disadvantages resulting from the aforementioned thinning of the HDD, VCM magnet 8 is provided with a protrusion 9, as shown in FIG. 5. This protrusion 9 is provided for increasing a magnetic flux density, thereby obtaining the force for driving a motor in cooperation with an iron piece 60 (see FIG. 6). However, in this case, the torque constant of the VCM magnet 8 becomes uneven depending on the rotational angle and therefore biasing force also becomes uneven. As a consequence, there is the disadvantage that positioning the actuator with the servo control becomes difficult particularly at the outer portion of a disk. Also, there is the disadvantage that a different made-to-order VCM magnet 8 must be prepared for each HDD, and consequently, the VCM magnet 8 is not suitable as a component which is attached to a HDD after fabrication of the HDD.

To compensate for disadvantages resulting from the aforementioned thinning of the HDD, the magnetic force of a lock magnet 70 (see FIG. 6) provided on the actuator is increased to strongly attract the iron piece 60. However, in this case, a problem arises during a load operation. When power is turned on, a large current has to flow in order to separate (or, to load) the actuator from the lock magnet 70. In many cases the separation becomes difficult because the value of current which flows through the coil and the torque constant of the VCM are limited due to a reduction in the size of the HDD. Also, even if the separation of the actuator from the lock magnet were successful, the actuator would forcibly be moving fast when separated. This causes an additional problem in that it becomes difficult to read out servo information from a disk in a short time. More specifically, servo control for positioning an actuator becomes difficult particularly at the outer portion of a disk.

An object of the present invention is to provide a mechanism which assists rotation of an actuator when the actuator assembly is removed to a ramp during an unload operation.

Another object of the present invention is to provide a mechanism which requires no excess separating force during a load operation.

Still another object of the present invention is to provide a mechanism which controls load and unload operations without making servo control for positioning an actuator difficult at the outer portion of a disk.

SUMMARY OF THE INVENTION

According to the present invention, there is provided an apparatus for guiding and locking a rotary actuator at a limiting rotational angle in a disk storage apparatus, comprising: a housing; a rotary actuator mounted on the housing so that it is rotatable on an axis; a motor for rotating the rotary actuator by an induced current; magnetic attracter provided at a position radially remote from the axis, the magnetic attracter being rotatable integrally with the rotary actuator; magnetic locker provided in the housing for locking the rotary actuator at the limiting rotational angle in magnetic cooperation with the magnetic attracter; and rotation assistant provided in the housing at a position corresponding to a predetermined angle of the rotary actuator, the rotation assistant being adapted for assisting rotation of the actuator assembly when current is given to the motor and the actuator assembly is rotated to the limiting rotational angle, in magnetic cooperation with the magnetic attracter.

In a preferred form of the present invention, the position of the rotation assistant is a position which can assist rotation of the rotary actuator when the rotary actuator is unloaded to a ramp.

In another preferred form of the present invention, the magnetic pole of the magnetic locker and the magnetic pole of the rotation assistant are set so as to be in opposite directions in a relation of disposition opposed to the magnetic attracter.

DESCRIPTION OF PREFERRED EMBODIMENTS

Figure 6:
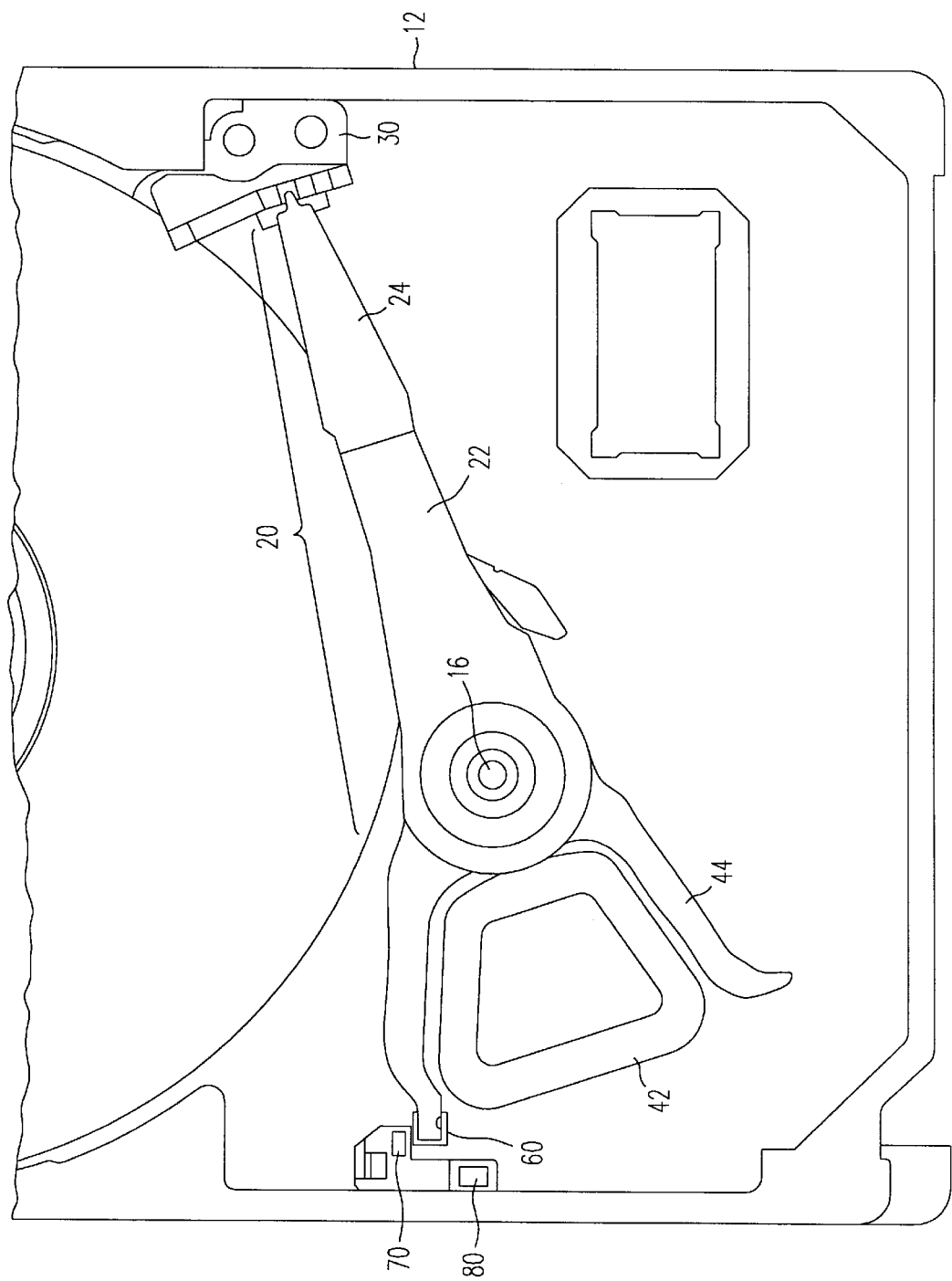
FIG. 6 is a plan view showing the relation of disposition between a magnet piece, a retract magnet, and a lock magnet in an HDD.

FIG. 6 is a plan view showing the relation of disposition between a magnet piece 60, a lock magnet 70, and a retract magnet 80 which is added by the present invention.

Figure 7:
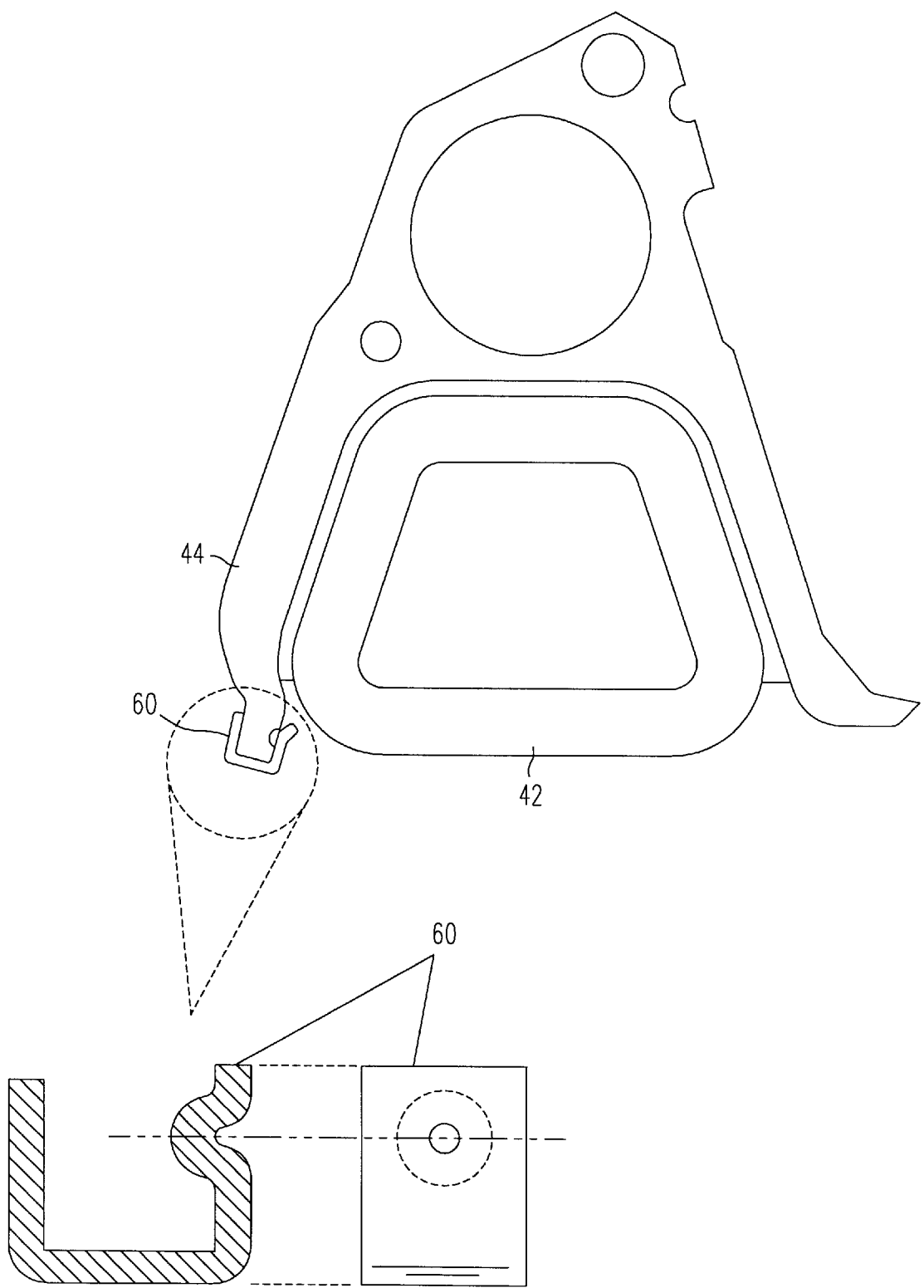
FIG. 7 is a plan view showing a coil support assembly and an iron piece which is attached to the coil support assembly.

FIG. 7 is a plan view showing the iron piece 60 which is provided on the coil support 44 of a coil support assembly 40. The iron piece 60 performs interaction which cooperates magnetically between the lock magnet 70 and the retract magnet 80. The iron piece 60 functions as a magnetic attracter. The lock magnet 70 functions as magnetic lock means in magnetic cooperation with the iron piece 60. The retract magnet 80 functions as rotation assistant in magnetic cooperation with the iron piece 60.

Iron piece 60 may be a ferromagnetic body other than iron, and the lock magnet 70 and the retract magnet 80 may be electromagnets other than permanent magnets. Since the gist of the present invention resides in that the iron piece 60, the lock magnet 70, and the retract magnet 80 are set so that they interact magnetically, design change can easily be made by other alternative means.

In this embodiment, in order to make efficient use of space in the housing 12 of the thin type HDD, the rotation assistant is not set on the side (i.e., on the side where the actuator assembly 20 is present) but rather on the side where a coil of wire is present (i.e., on the side of the coil support assembly 40). However, it will easily be understood that the technical concept of the present invention is not limited to such a specific case.

In the case where the coil support 44 itself is material easily magnetized as magnetic attracter, the iron piece 60 is not necessarily provided as a separate member, but it can be attached at the end portion of the coil support 44. Of course, the iron piece 60 does not always need to be attached to the end portion, and if it is set at a position radially remote from the pivot shaft of the actuator assembly, rotational moment can be produced by magnetic attracting force. Although there are various methods for attaching the iron piece 60 to the actuator assembly, in FIG. 7 the iron piece 60 is formed into a U-shaped clip type and is provided with a protruding portion so that the protruding portion can be fitted into a recess provided in the coil support 44. Material such as SUS420J2-CSP and SUS430 is employed as the material of the iron piece 60. In this embodiment, the thickness of the iron piece 60 is 0.3 mm and the configuration has a shape contained in a range of a U-shaped rectangular shape of 2.1 mm×1.9 mm×1.3 mm.

Figure 8:
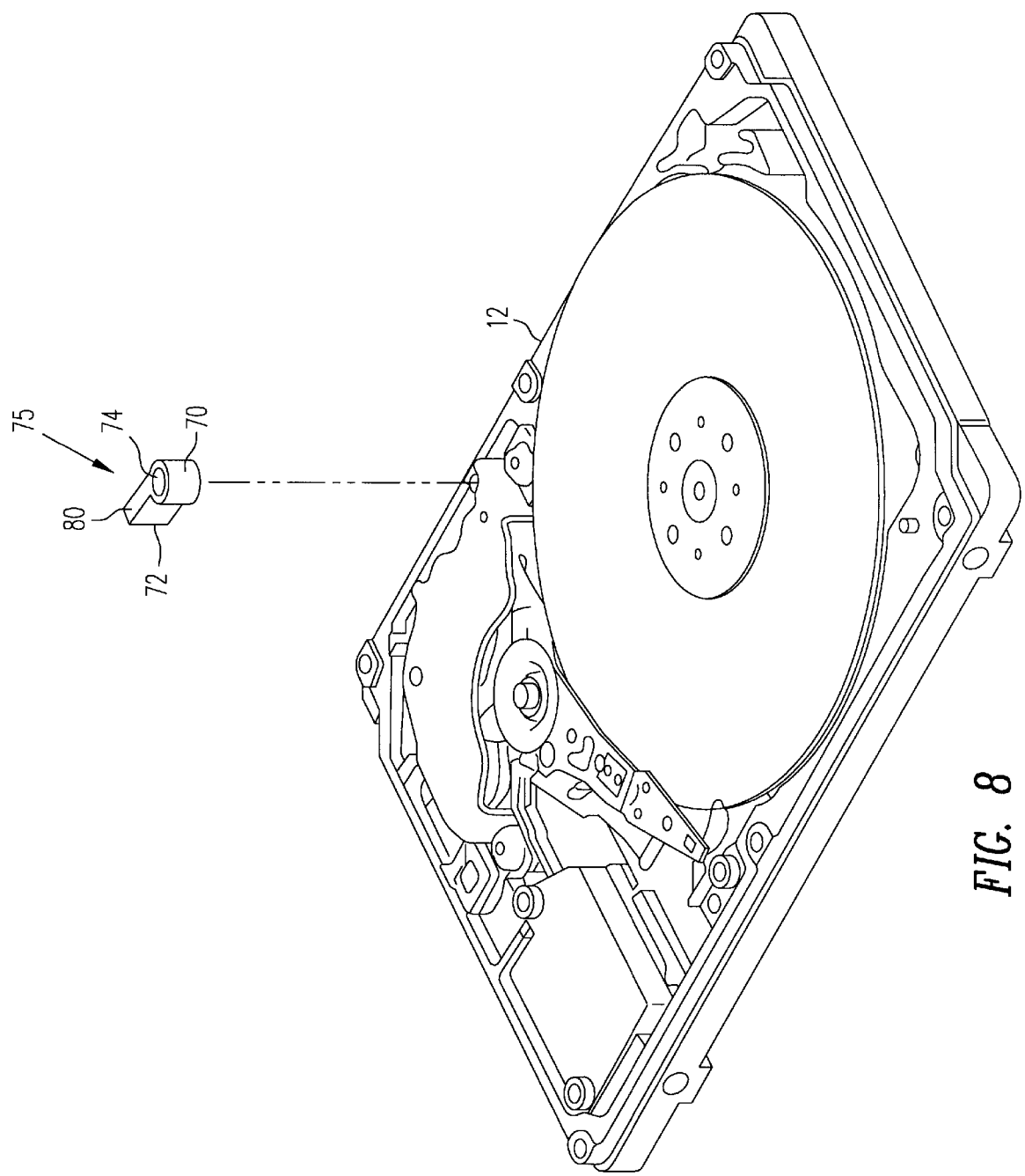
FIG. 8 is a perspective view showing the place to which a magnet assembly, integrally including a retract magnet and a lock magnet, is attached in the HDD.

FIG. 8 is a perspective view showing the place where magnet assembly 75 is attached in the HDD, integrally including the lock magnet 70 and the retract magnet 80. The magnetic assembly 75 is formed with an opening at a portion 74 indicated by an arrow, and the opening is inserted onto a protrusion provided on the side of the housing 12, whereby attaching can easily be performed. Of course, the magnetic assembly 75 can easily be attached to the housing 12 by other methods (for example, adhesion).

The original function of the lock magnet 70 is to lock the actuator, that is, to hold a rotary actuator at a limiting rotational angle. The function of the retract magnet 80 in the present invention is to assist the process where the rotary actuator is rotated to the limiting rotational angle. More specifically, the function of the retract magnet 80 is to apply by magnetic force assisting torque to the rotary actuator.

Figure 9:
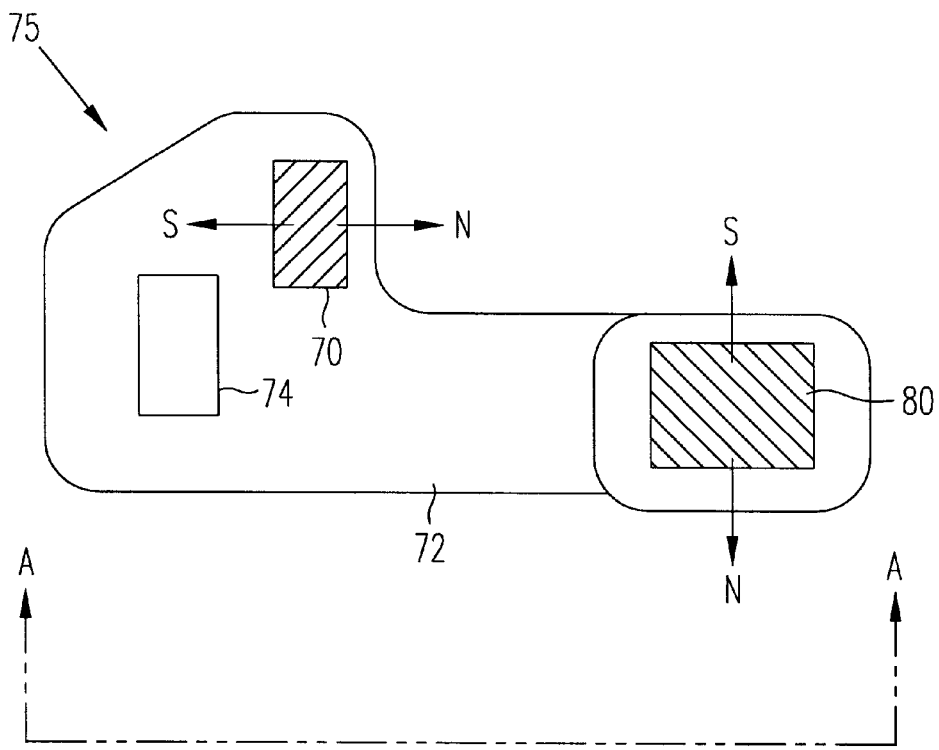
FIG. 9 is a plan view of the magnet assembly 75.

FIG. 9 shows a plan view of the magnet assembly 75, and the sizes of the lock magnet 70 and the retract magnet 80 and the plane relation of disposition therebetween can be seen.

Figure 10:
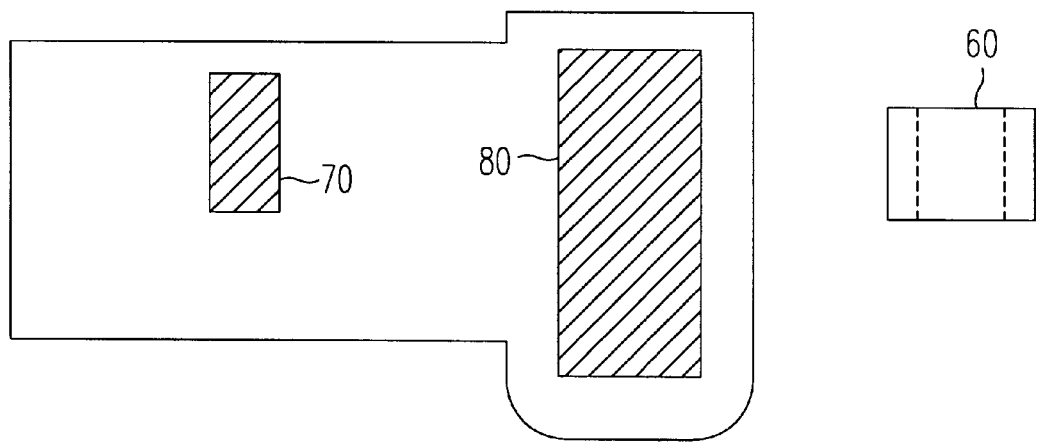
FIG. 10 is a side view of the magnet assembly and the iron piece in FIG. 9.

FIG. 10 shows a side view taken substantially along line A—A of FIG. 9, and the sizes of the lock magnet 70 and the retract magnet 80 can be seen from the side surface. In combination with FIG. 9, the relative spatial disposition relation of the entire magnet assembly 75 can be seen. The iron piece 60 shown in FIG. 10 is a reference example for showing the disposition relation of the iron piece with respect to the thickness direction of the HDD, and there is no position change in the thickness direction of the iron piece 60 regardless of the rotational angle.

The magnet assembly 75 can be constituted as an integral component where the two magnets 70 and 80 are covered with the same rubber 72 or the like. If constituted like this, there will be no change in the spatial disposition between the magnets 70 and 80. Also, as previously described, the magnet assembly 75 can easily be attached to the housing 12 through the opening 74 thereof. In addition, even if the iron piece 60 crashed on the lock magnet 70, transmission of a great shock to the magnetic head is prevented by intervention of the elastic cover of the rubber 72. That is, a member for buffering shock can be adopted. Furthermore, if rubber thickness can be appropriately set, it will be useful in suitably separating the iron piece 60 and the lock magnet 70 from each other in a locked state and in controlling distance between them so that magnetic force required for locking the actuator can be obtained. Note that if the actuator is only locked by magnetic force, the iron piece 60 and the lock magnet 70 do not need to be contacted with each other. The term "lock" should be broadly interpreted.

As evident in FIGS. 9 and 10, it can be understood that if the retract magnet 80 is added according to the present invention and utilized with respect to the lock magnet 70 of the background art, there will be the advantage that the physical dimension of the lock magnet 70 can be reduced. This will become apparent if the lock magnet 70 and the retract magnet 80 are compared with each other in both size and magnetic force.

First, the lock magnet 70 and the retract magnet 80 are compared with respect to magnetic force. Taking a lock magnet 70 utilized in the present invention as a reference, it is NEOREC (trademark of TDK Corp.) 35H made by TDK Corporation and the $(BH)_{max}$ is 35M $GO_e$. Taking a retract magnet 80 used in the present invention as a reference, it is NEOREC 41H made by TDK Corporation and the $(BH)_{max}$ is 41M $GO_e$. $(BH)_{max}$ represents maximum energy product.

Figure 11:
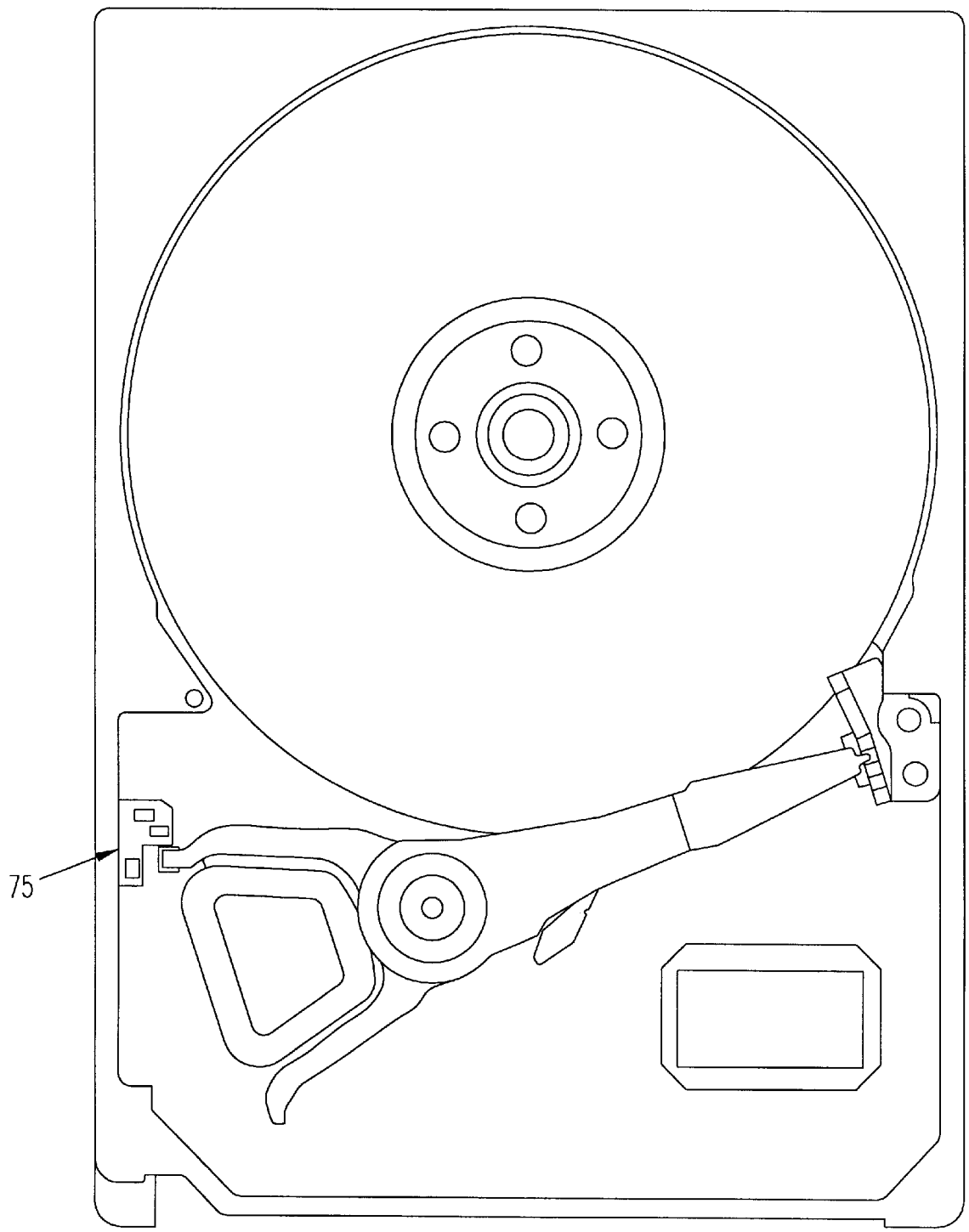
FIG. 11 is a plan view showing the state of the actuator assembly at a rotational angle of 0°.

FIG. 11 is a plan view showing the state where the actuator assembly has been positioned on the actuator surface of the ramp 30 at the rotational angle where rotation of the tab 26 is limited. This rotational angle is both the arrival position of the unload operation and the departure position of the load operation. In this embodiment, this position is taken to be a rotational angle of 0° and is defined as a limiting rotational angle. This limiting rotational angle is often called a parking position.

In this embodiment, the rotational angle of the HDD in a plan view will hereinafter be measured in a counterclockwise direction with the limiting rotational angle of 0° as a start point (reference), and all rotational angles will be expressed with a plus sign. The limiting rotational angle corresponds to the locked position of the rotary actuator when seen from the relationship between the lock magnet 70 and the iron piece 60, while it corresponds to the removal position of the rotary actuator on the opposite side of the spindle 16 when seen from the relationship between the tab 26 on the point end of the rotary actuator and the ramp 30.

The rotational angle range of the actuator assembly 20 is expressed by an acute angle (a narrower angle) interposed between the two limiting rotational angles. After completion of the fabrication and assembly of HDDs, the actuator assembly 20 cannot be rotated in a minus direction (clockwise direction) beyond the limiting rotational angle during normal operation as long as disassembly, repair, or maintenance is not performed.

Figure 1:
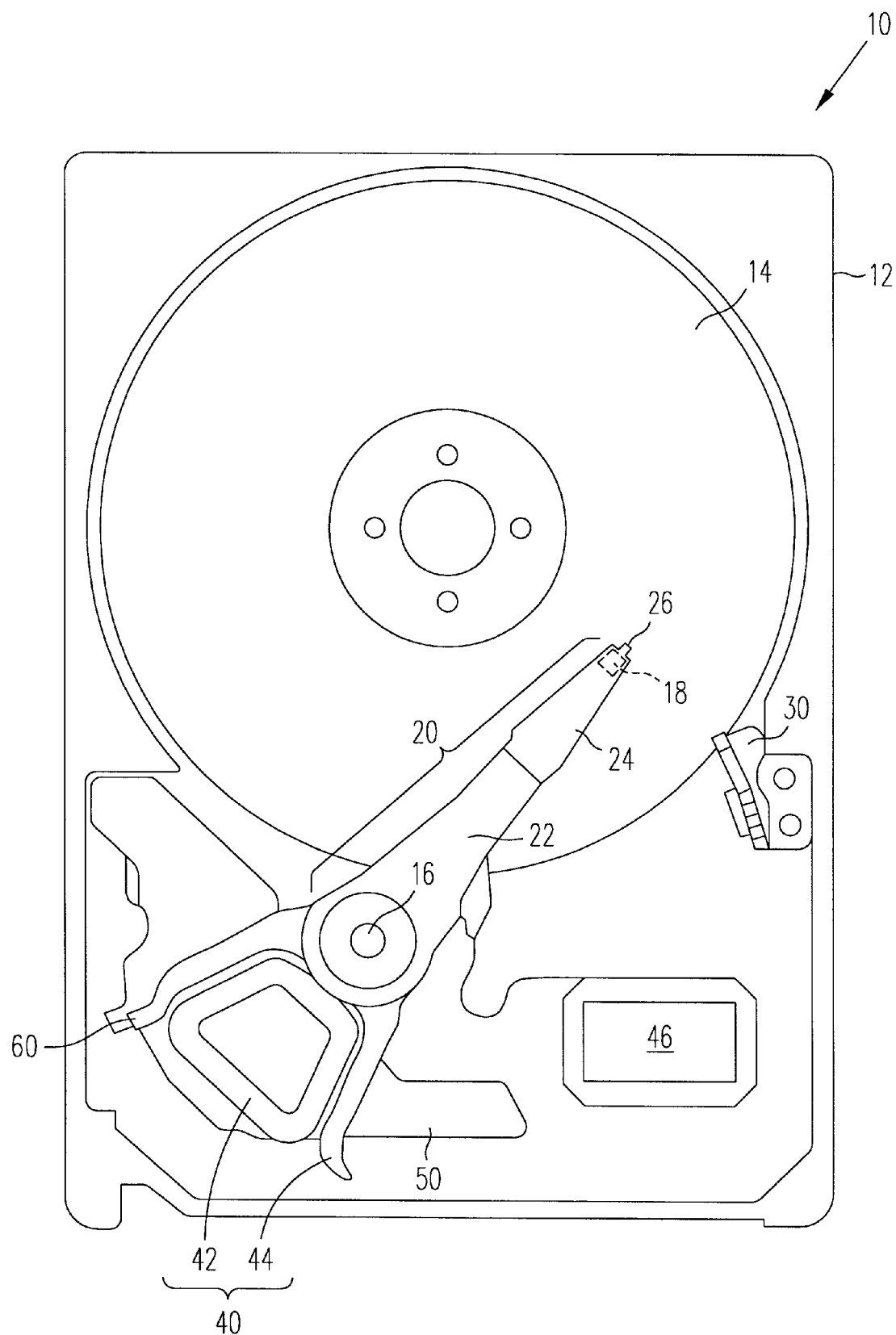
FIG. 1 is a plan view showing the interior structure of an HDD employing a load/unload technique.
Figure 2:
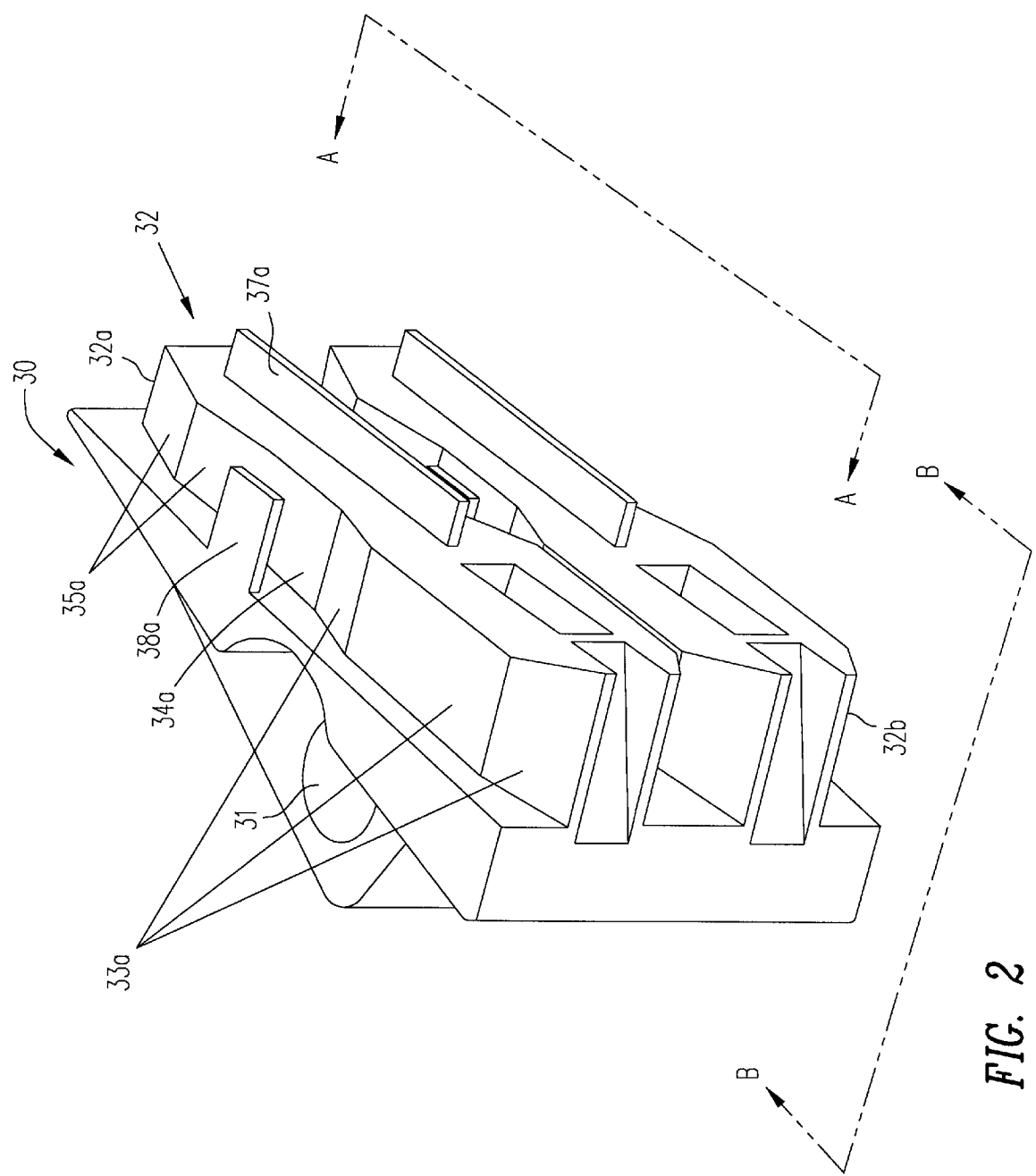
FIG. 2 is a perspective view showing a ramp employed in the load/unload technique.
Figure 3:
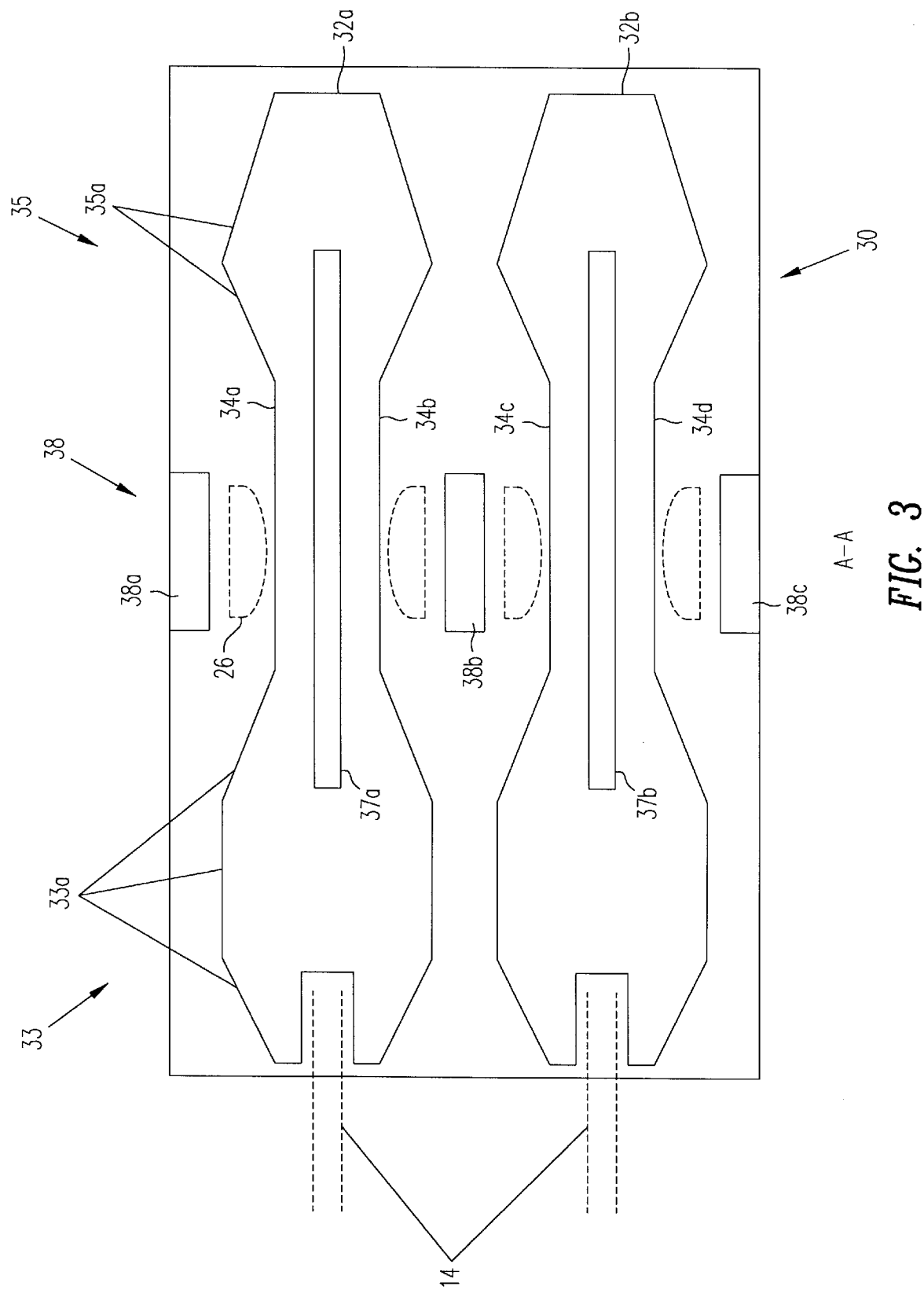
FIG. 3 is a side view of the ramp in FIG. 2 taken substantially along line A—A of FIG. 2.
Figure 4:
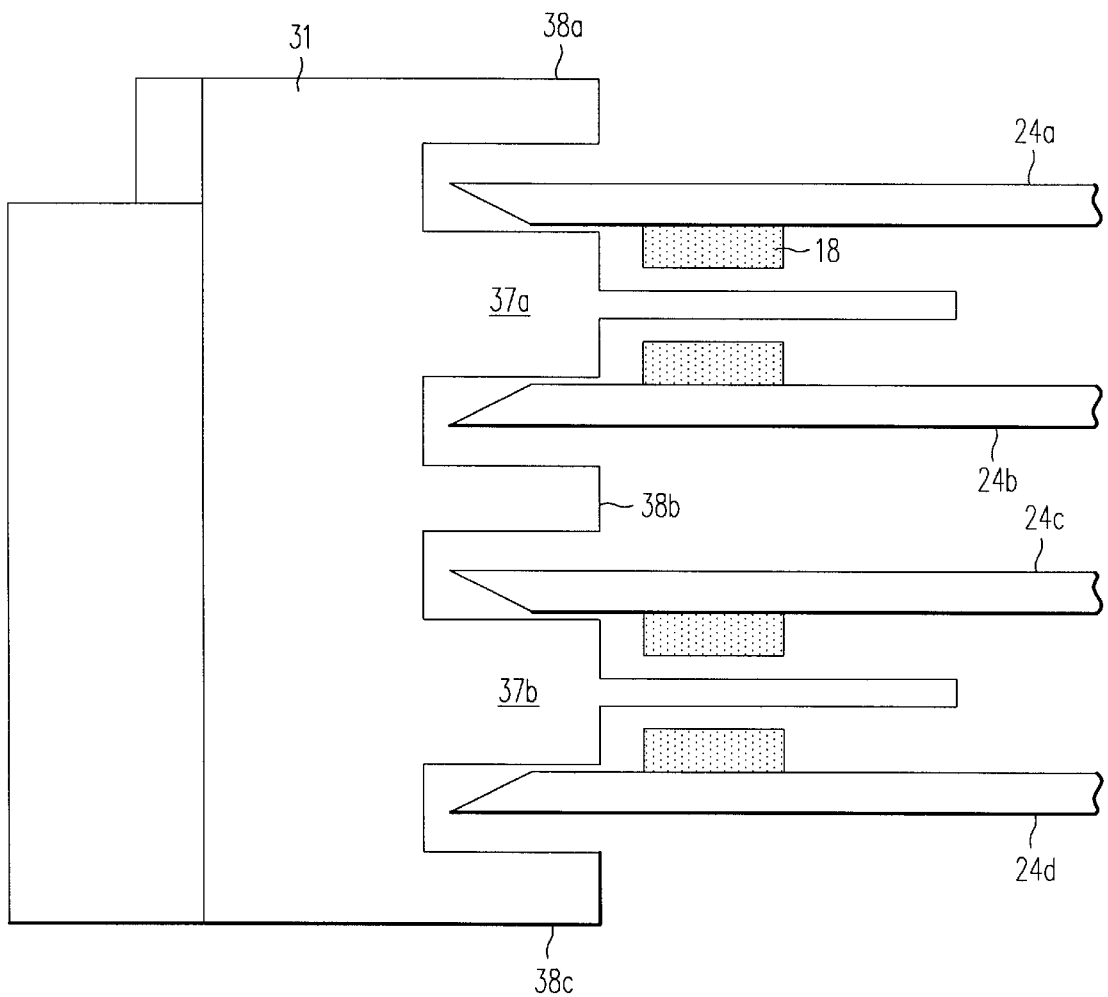
FIG. 4 is a side view of the ramp in FIG. 2 taken substantially along line B—B of FIG. 2.
Figure 5:
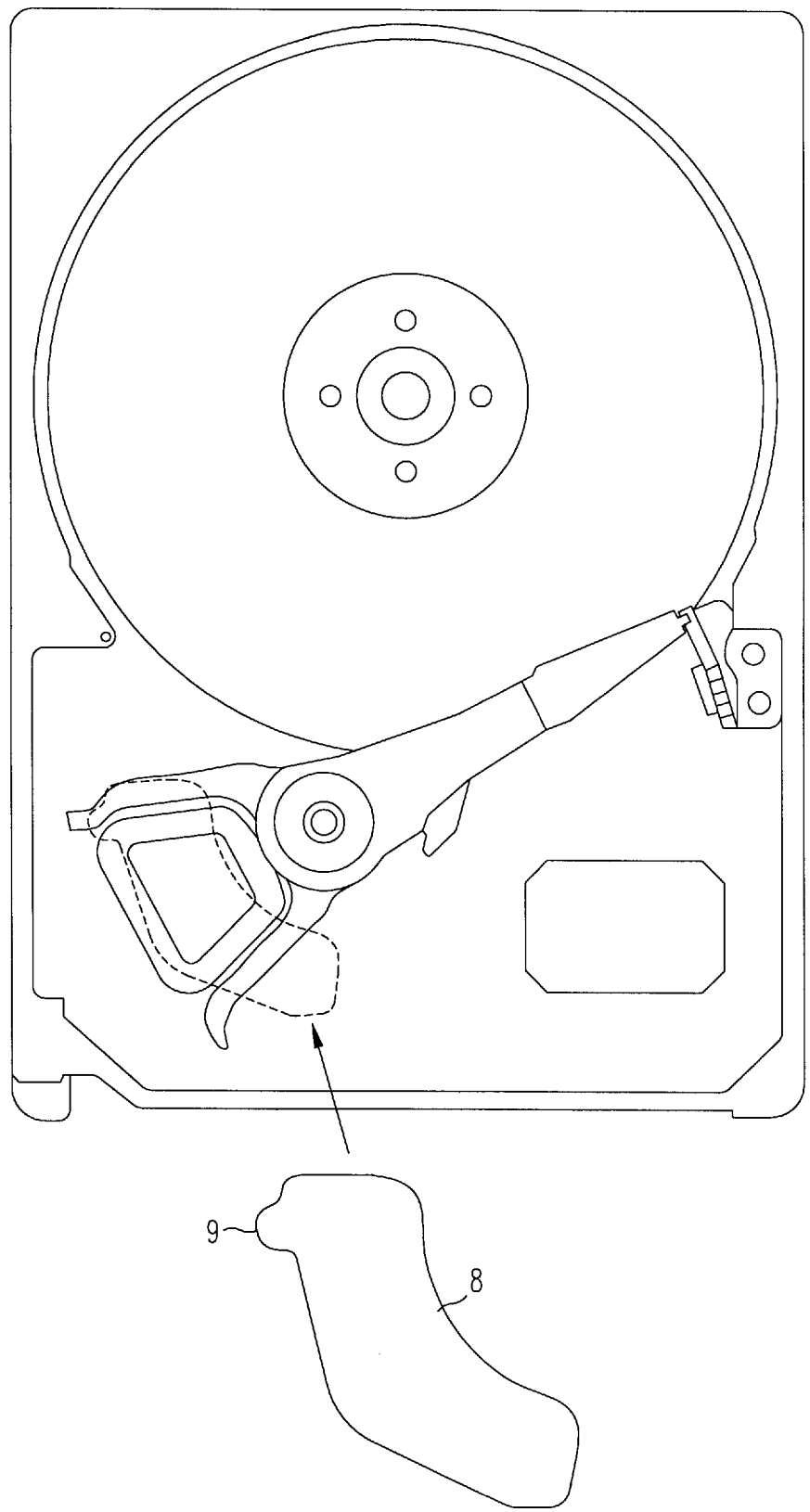
FIG. 5 is a plan view showing the case of a protruding portion provided on a VCM magnet and the virtual attaching position.
Figure 12:
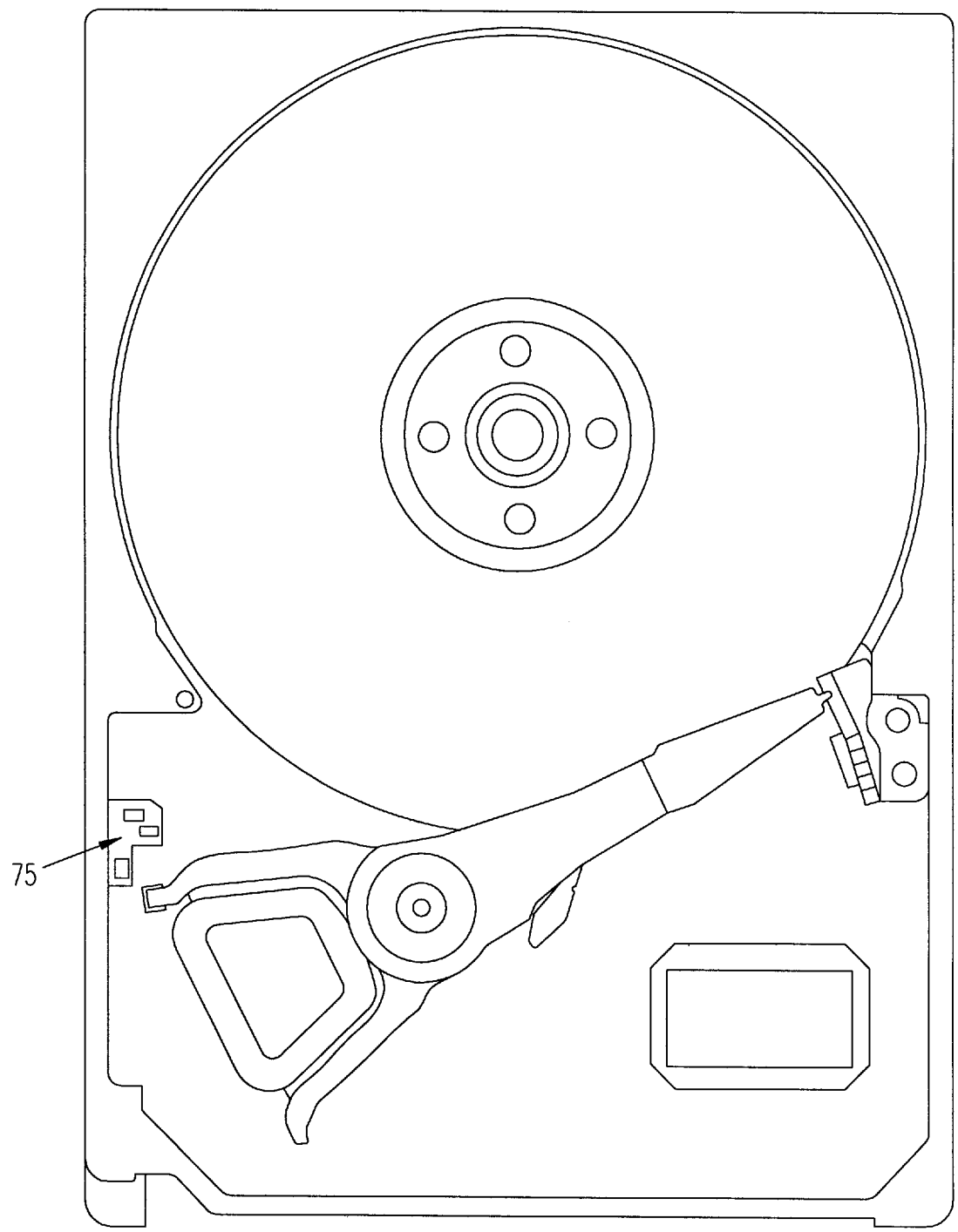
FIG. 12 is a plan view showing the state of the actuator assembly at a rotational angle of 10°.

If the retract magnet 80 of the present invention is utilized, assistance to torque is possible at all rotational angles or in all rotational angle ranges. That is, it will be sufficient if the retract magnet 80 is mounted at a position corresponding to the rotational angles and rotational angle ranges. On the other hand, in view of the problems to be solved in the aforementioned load and unload operations by the present invention, is important to assist the unload operation. The unload operation is such an operation as to range over a certain rotational angle range. In the unload operation, the operation of going over the first inclination (on the left side of 33a in FIG. 3) set on the ramp 30 is most important. Since this operation gives rise to maximum resistance to a sliding motion, it becomes important to assist rotation at that position. The position is shown in FIG. 12 and corresponds to a rotational angle of 10°. For this reason, in FIG. 14, the second greatest attracting torque is set at a rotational angle of 10° (the greatest attracting torque is set at a rotational angle of 0°). Since the unload operation further continues over a certain rotational angle range, there is no reason that the process of rotation of the rotary actuator must be assisted locally at a rotational angle of 10°.

Figure 13:
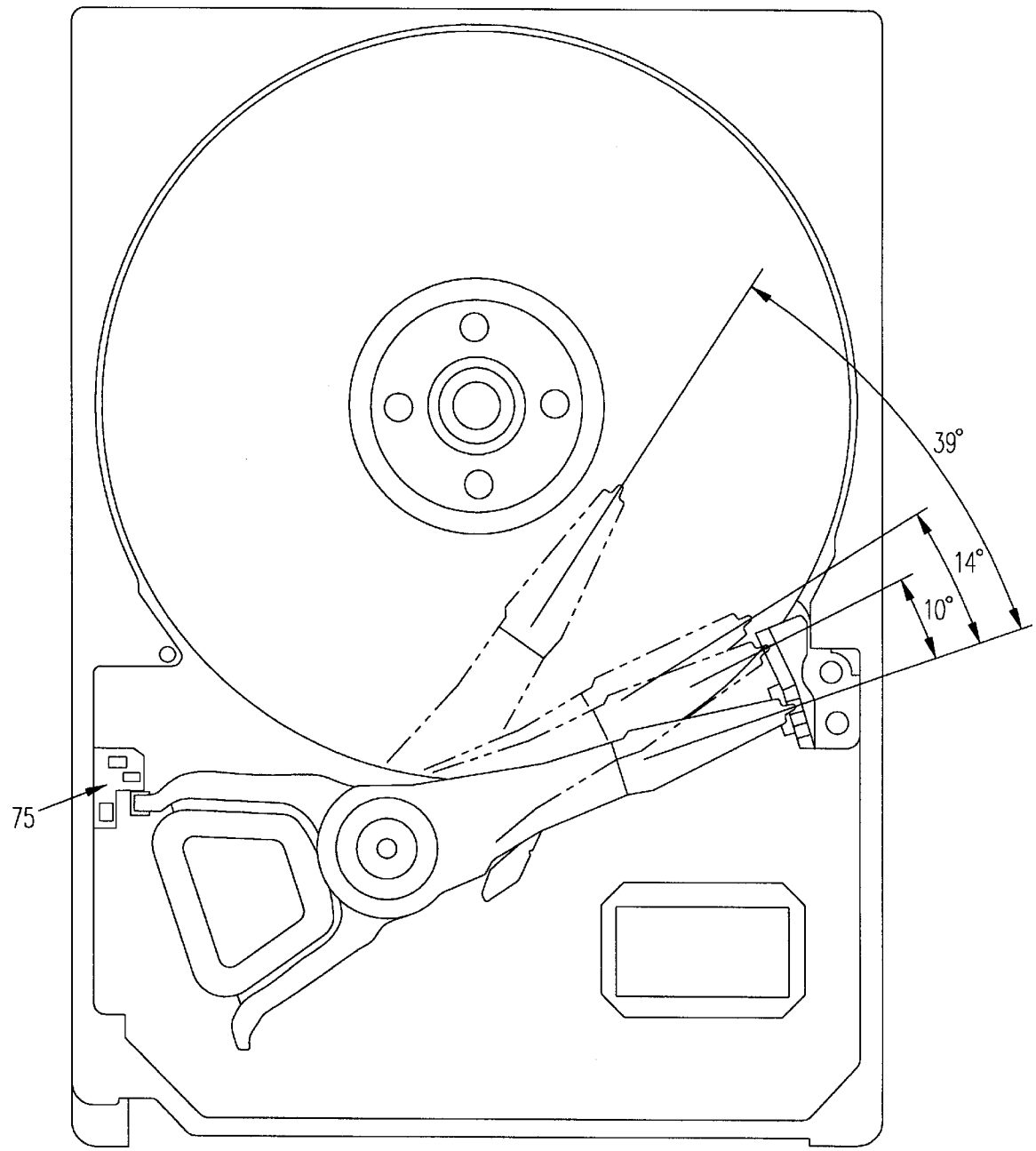
FIG. 13 is a plan view showing the case where the actuator assembly is at various rotational angles and the rotational angle range.
Figure 14:
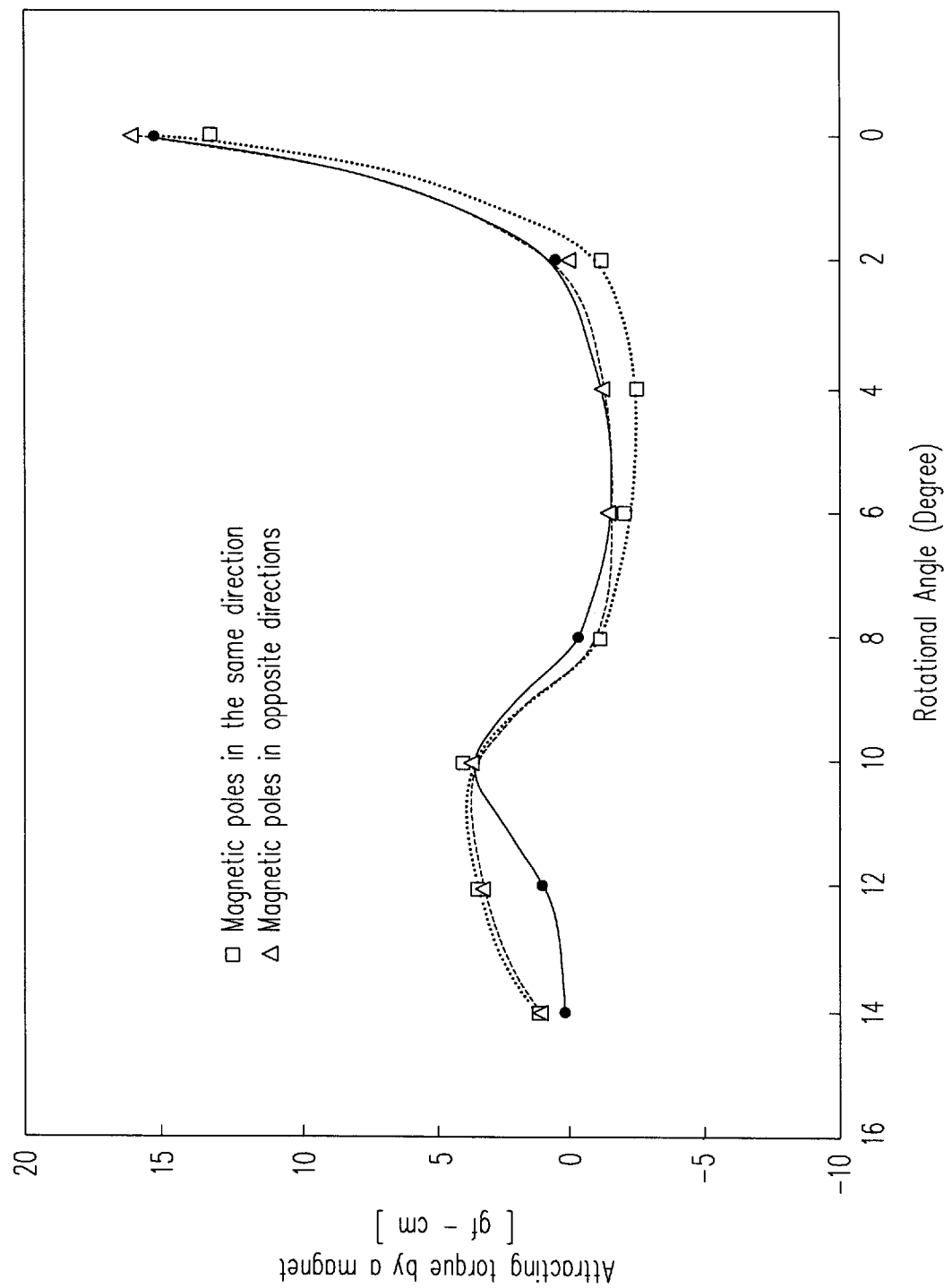
FIG. 14 is a graph of experimental results showing how the magnetic attracting torque produced by a magnet varies at each rotational angle when magnetic poles of a retract magnet and a lock magnet are in the same direction and when magnetic poles are in opposite directions.

If emphasis is only on a local torque assistance for going over a ramp, the attracting force will be set by stages only at a rotational angle of 10° (discontinuously). However, such setting will be almost impossible if a phenomenon where a magnetic field distribution is actually formed is considered. In the embodiment of the present invention, the influence of the magnetic field appears in a range of 14° to 10°, as shown in FIG. 14. In the case where a permanent magnet is utilized, the influence will extend to a certain range. However, since the data area of the disk is present at a rotational angle more than 14°, it is desirable that the influence of the magnetic attracting force be reduced as much as possible in order to smoothly perform servo control for positioning a head at a rotational angle more than 14°. In the embodiment of the present invention as shown in FIG. 13, the data area on which read and write operations are performed is 39° at the innermost portion of the disk and 14° at the outmost portion.

Next, consider the directions of magnetic poles, that is, the directions of the north and south poles of the actuator lock magnet 70 and the retract magnet 80 which are effective in achieving the objects of the present invention.

FIG. 14 is a graph of experimental results showing how the magnetic attracting torque produced by a magnet varies at each rotational angle when magnetic poles are in the same direction and when magnetic poles are in opposite directions.

Figure 15A:
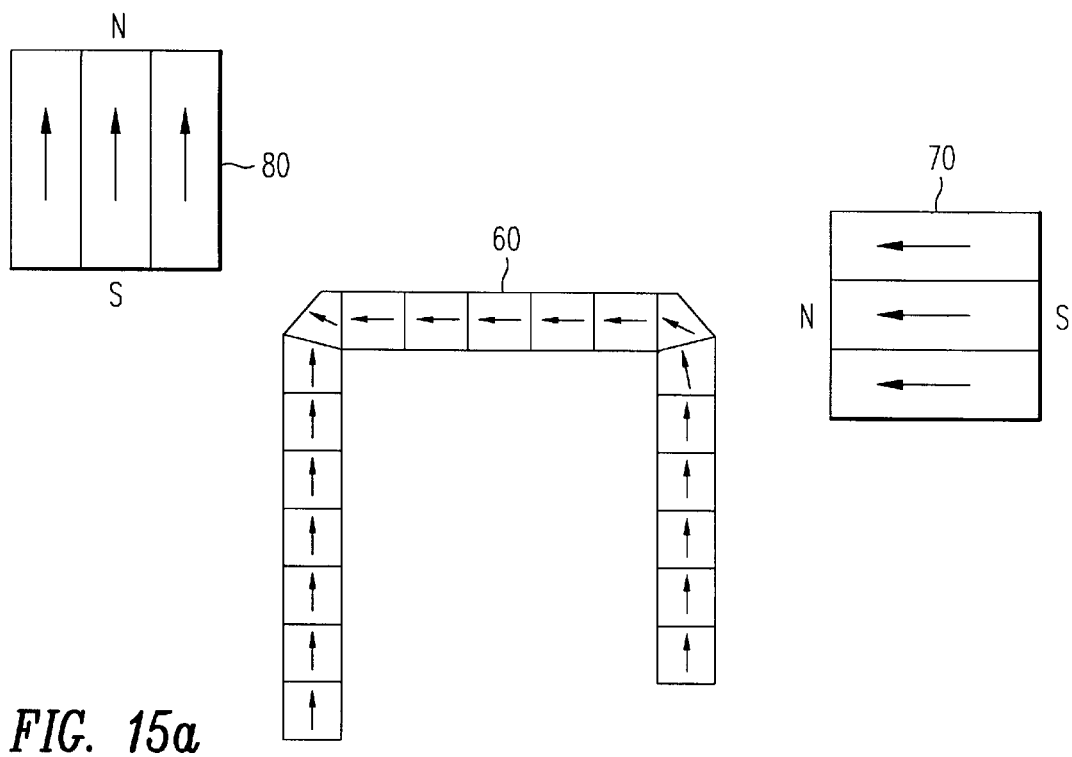
FIGS. 15a and 15b are enlarged plan views showing the result as the magnetized state of the iron piece was simulated at a rotational angle of 2°.

The direction of a magnetic pole can be expressed by the relation of disposition opposed to the iron piece 60 which is magnetic attracter. That is, in the case where N and S poles are disposed as shown in FIG. 9 or FIG. 15a, magnetic poles are in opposite directions. The reason for this is that the direction where the iron piece 60 moves faces the N pole of the lock magnet 70 and the S pole of the retract magnet 80, and therefore they are in opposite directions.

In connection with the problems to be solved by the present invention, the actuator lock magnet 70 and the iron piece 60 will be sufficient if they meet the minimum requirement of a locking function. Magnetic force more than is necessary is unnecessary. Also, the retract magnet 80 will suffice if it assists torque in connection with the ramp 30 when the iron piece 60 is retracted to the ramp 30. After completion of the first retract operation, the actuator lock magnet 70 should perform the next retract operation.

After the iron piece 60 has been retracted by the retract magnet 80 (the most important process of the retract magnet 80), the position (radial position) at which the retract magnet 80 and the iron piece 60 are nearly aligned with each other is at a rotational angle of 8°.

On the other hand, the magnetic attracting force of the actuator lock magnet 70, as shown in FIG. 14, is sharply increased at a rotational angle of about 20. This is desirable for satisfying the locking function. However, as previously described, the magnetic force in a range of 0° to 2° must be carefully set so that separating force which is more than necessary does not occur during a load operation and excessive pulling force does not occur during an unload operation.

In the rotational angle range of 2° to 8°, which is the stage preceding the locking stage, it is desirable that the iron piece 60 is not pulled by both the actuator lock magnet 70 and the retract magnet 80. To set such a desirable state, experiments have been made with respect to whether the N and S poles of the actuator lock magnet 70 and the retract magnet 80 are disposed in the same direction or in opposite directions. The experiment results are shown in FIG. 14. From these results it has been confirmed that the magnetic attracting torque can be made smaller in the case where magnetic poles are in opposite directions than in the case where magnetic poles are in the same direction. As evident in the graph of FIG. 14, the magnetic attracting torque of force is closer to a value of 0 at almost all rotational angle ranges in the case where magnetic poles are in the same direction than in the case where magnetic poles are in opposite directions. This means that the influence of the magnetic attracting force is smaller in the case where magnetic poles are in opposite directions. The curve indicated by a solid line shows the result of experiments made with respect to the case where the retract magnet 80 was further reduced in size and set at a position where the iron piece 60 can get closer to the retract magnet 80.

Figure 15B:
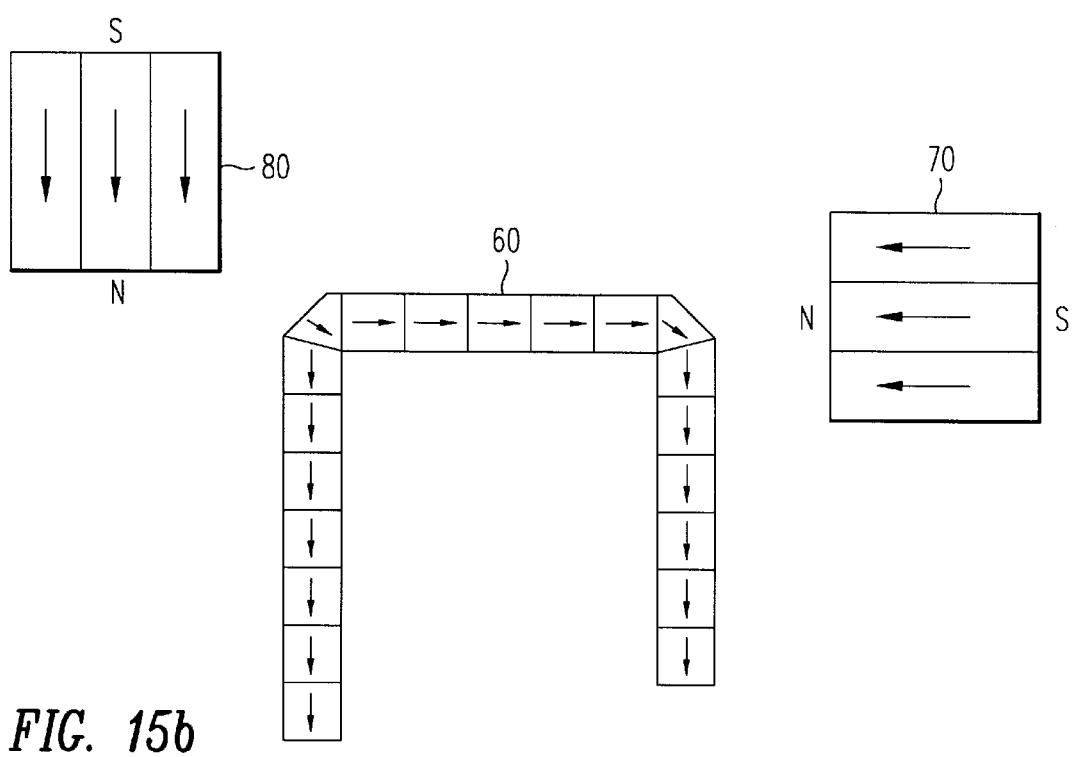

FIG. 15 is an enlarged plan view showing the result as the mutual relation of the magnetic field between the iron piece 60, the actuator lock magnet 70, and the retract magnet 80 was simulated at a rotational angle of 2°, and shows the direction and magnitude of the magnetic field (or magnetization) in terms of vectors. The analyzing method is three-dimensional magnetic field analysis by way of a magnetic moment method. FIG. 15a shows the result in the case where magnetic poles are in opposite direction, and FIG. 15b shows the result in the case where magnetic poles are in the same directions.

According to the present invention, the actuator assembly is appropriately rotated and assisted during an unload operation.

We claim:

1. An apparatus for controlling the movement of a rotary actuator in a hard disk drive, comprising:

a housing;

a rotary actuator rotatably mounted on the housing;

a voice coil motor for rotating the rotary actuator;

a magnetic attracter on the actuator;

a magnetic locker in the housing for locking the rotary actuator; and a magnetic rotation assistant in the housing spaced apart from the magnetic locker, the rotation assistant assisting rotation of the actuator towards the magnetic locker.

2. The apparatus of claim 1, further including a load/unload ramp for receiving the actuator when the hard disk drive is shut off.

3. The apparatus of claim 2, wherein the magnetic rotation assistant assists rotation of the actuator when the actuator is on the load/unload ramp.

4. The apparatus of claim 3, wherein the actuator is rotated by counter electromotive forces collected from the rotational force of the disk drive after it is shut off.

5. The apparatus of claim 1, wherein the magnetic attracter is a ferromagnetic body.

6. The apparatus of claim 1, wherein the magnetic locker and the rotation assistant are permanent magnets.

7. The apparatus of claim 3, wherein the magnetic attracter is a ferromagnetic body.

8. The apparatus of claim 3, wherein the magnetic locker and the rotation assistant are permanent magnets.

* * * * *